United States Patent [19]
Mohrman

[11] Patent Number: 5,137,416
[45] Date of Patent: Aug. 11, 1992

[54] VEHICLE COMPRESSED AIR ENERGY CONVERTER

[76] Inventor: John H. Mohrman, Willow St., P.O. Box 280, Middleport, Pa. 17953

[21] Appl. No.: 654,045

[22] Filed: Feb. 11, 1991

Related U.S. Application Data

[63] Continuation-in-part of Ser. No. 490,284, Mar. 8, 1990, abandoned.

[51] Int. Cl.$^5$ ............................................. F03D 3/00
[52] U.S. Cl. ..................................... 415/2.1; 415/4.2; 415/121.2; 416/109; 416/116
[58] Field of Search ............... 416/87, 88, 98, 101, 416/108, 109, 116, 17; 415/2.1, 4.1, 4.2, 4.4, 121.2

[56] References Cited

U.S. PATENT DOCUMENTS

| | | | |
|---|---|---|---|
| 3,876,925 | 4/1975 | Stoeckert | 415/121.3 |
| 4,455,491 | 6/1984 | Lanzrath | 416/109 |
| 4,789,297 | 12/1988 | Mrasek | 416/88 |

FOREIGN PATENT DOCUMENTS

| | | | |
|---|---|---|---|
| 134900 | 10/1933 | Austria | 416/17 |
| 736278 | 6/1943 | Fed. Rep. of Germany | 416/109 |

*Primary Examiner*—Edward K. Look
*Assistant Examiner*—James A. Larson

[57] ABSTRACT

A vehicle compressed air energy converter has been developed for use along vehicular roadways, railways and airfield runways to collect wind pressure developed by the vehicles, trains and aircraft moving through the atmosphere and convert such air motion to other useful forms of energy. The converter is activated by the force of the compressed air movement entering the converter and pushing the retractable air fins of the converter in a circular motion. That circular motion is transferred to a central shaft set in bearings at either end of a housing. As the multiplicity of air fins held in place by hinges on a circular rotating base move within the converter housing, the fins move into a retracted posture so as to offer less air resistance as they circulate within the portion of the converter not subject to movement of air from the exterior of the housing. As the fins rotate to the position wherein exterior compressed air enters the converter the fins then extend to a position to maximize the resistance to the incoming wind pressure. The air pressure causes rotation of the fins and central shaft of the converter thereby transmitting torque energy to the belt pulleys on the shaft. The wheels attached to the outer edge of each air fin travels on elliptical shaped band tracks thereby causing the fins to retract and extend as rotation occurs.

2 Claims, 3 Drawing Sheets

VEHICLE COMPRESSED AIR ENERGY CONVERTER

This application is a continuation-in-part of Ser. No. 490,284, filed Mar. 8, 1990, abandoned.

BACKGROUND OF THE INVENTION

1. Field of Invention

This invention relates to the use of the atmospheric compressed air that is generated by individual vehicles traveling at relatively high speed along roadways, railways and airport runways. That air mass is aerodynamically compressed by the velocity of each vehicle moving through the atmosphere and is directed in an oblique direction to either side of the vehicle as it passes a given point in the path that it travels. This invention is capable of utilizing such compressed air pressure to convert the force contained therein into torque energy as developed horsepower (HP) to propel ancillary equipment for such purposes as generating electricity, pumping liquids and numerous other uses. The design of the converter is unique in that the air fins that serve as the surface that receives the compressed air are retractable when not under pressure. This single feature allows the rotating section of the converter to operate more efficiently because of less air resistance encountered by the air fin surfaces as they rotate. The converter is intended to be installed in a fixed location alongside vehicular paths as described herein above. The converter design and construction is of a nature to be capable of withstanding sudden and high velocity masses of compressed air pressure generated by passing vehicles. Although this invention operates in a rotating mode to perform the end function, it is unlike any other air movement utilization device because of the elliptical shape of the tracks that cause the air fins to operate by retracting and extending as they rotate. Wind gauge tests conducted reflect that the air pressure force generated by passing vehicles is approximately the same velocity as the vehicle even at distances as much as 15-20 feet away from the traveling surface i.e., if a vehicle or a constant line of vehicles are traveling at 55 MPH the air pressure force at the distances specified above are of an equal or higher rate. In a normal mixture of various size vehicles forming a line of traffic on a roadway or railway air pressure turbulence develops at the side of the traveled surface causing the compressed air pressure force to increase. With the ever increasing volume of motor vehicles on roadways, underground and on ground surface track traveling vehicles and aircraft traffic on airport runways, my invention will serve to utilize the compressed air pressure converted to other forms of energy as a new source of readily available energy.

2. Description of Prior Art

No device or mechanism is known to have been invented for the specific purpose of converting the pressure of the air compressed by passing vehicular traffic into torque energy. It is well known that any mechanical device that could be identified as a turbine, from devices such as the water wheel to the development of steam turbines in the 1800's all meet that classification. Also, there is nothing novel in defining a turbine as a machine for converting the kinetic and/or thermal energy of a flowing fluid into useful rotational energy. Also that the working fluid may be air, hot gas, steam or water. However, application and inherent design of the turbines to date varied greatly when considering that at one end of the use spectrum steam turbines were and are used for generating much of our electricity while the jet propulsion engine in aircraft uses an entirely different type turbine. Somewhere in between the ends of that spectrum are a multitude of turbines designed for specific usage but as Patents have incorporated design principles that are as old as the art itself. This invention, in similar design, was first presented in my application Ser. No. 07/490,284, filed Mar. 8, 1990 which was abandoned based on errors made by me in describing the invention as possibly portable and in presenting detail which was adjudged by examination to be relevant to U.S. Pat. No. 1,903,307 of Apr. 4, 1933 by B. G. Gillo and U.S. Pat. No. 3,876,925 of Apr. 8, 1975 by Christian Stoeckert. The design and operation of this invention is completely different than any of the wind turbines developed in the past including those that were or are under Patent.

SUMMARY OF THE INVENTION

This invention is a new and efficient means of utilizing the compressed air pressure developed by vehicles on roadways and railways and aircraft on runways to convert such air pressure to a new energy source. As the air pressure force enters the converter(s) through a heavy wire mesh covered air scoop and forms air pressure against the surface of the air fins of the converter the center cylinder and shaft of the converter are caused to rotate. During rotation of that mechanism the multiplicity of air fins not receiving air pressure retract thereby causing less air resistance as they rotate and substantially increases the efficiency of the converter to produce additional operating horsepower (HP). Retraction of the air fins is caused by the wheels mounted on the outer edge of each air fin traveling on elliptical shaped tracks within the converter housing. Each such wheel containing a flexible material tire rotates on ball-bearings attached to rod shafts on the air fin edge. As each air fin enters the area of the converter where the compressed air enters the housing the air fin is fully extended offering maximum resistance to the air forced to enter said converter. The air fins receiving the air pressure remain fully extended as the air stream passes through the converter and is discharged through the heavy wire mesh covered opening in the converter housing. As the center shaft is caused to rotate in bearings by the force communicated through the attached circular section by the operating air fins, V-belt pulleys at the end of the rotating shaft are used to drive ancillary equipment either aside of the converter housing or on the outer end of said housing. Any moisture or dirt particles entering the converter are discharged through the air discharge opening.

Further this invention is novel because of the design feature of the retracting and extending air fins that require an over-all smaller housing than other turbines. Also the invention can be installed alongside intermittently or heavily traveled vehicular roadways or railways and alongside runways used by aircraft without becoming a safety obstruction to such traffic.

It is the object of this invention to provide a vehicle compressed air energy converter that can be mounted alongside roadways, railways either above or underground and alongside runways used by aircraft in any numbers of units that roadside terrain will permit. Such converters to receive the compressed air force caused by the velocity of passing vehicles and to convert such compressed air force into developed horsepower (HP).

Thereby using such force to propel ancillary equipment used for such purposes as generating electricity, pumping liquids or other similar purposes.

A further object of the invention is to provide a vehicle compressed air energy converter that will operate more efficiently than similar devices because of less air resistance in the air fin operation of the converter thereby increasing the amount of developed horsepower (HP) produced.

A further object of the invention is to provide a vehicle compressed air energy converter that has a housing that is smaller than any similar device that can produce an equivalent or lesser amount of developed horsepower (HP).

A further object of the invention is to provide a vehicle compressed air energy converter that of simple design, easy to construct and structurally strong to withstand any velocity of compressed air pressure that may be encountered at the installed location(s).

Another object of the invention is to provide a multiplicity of vehicle compressed air energy converters along aforementioned vehicular traveled areas to provide a new source of usable energy in volumes or quantities not ever made available in the past.

Finally, it is a most fundamental objective and advantage of the invention to provide a design of the simplest sort, thereby departing from the prior art and with regard to such schemes as advanced by the patents and art herein above noted where, to fulfill the sole aim of such designs, the involved patentees have proposed structures so complex in nature that to actually fabricate such devices would require, in most instances unwarranted cost and abnormally excessive technical expertise and equipment. With regard to my invention, and in contrast, cost of fabrication, by the simplicity of the technical expertise involved is minimal, thereby permitting fabrication and installation of the unit at the most reasonable expense to the consumer.

BRIEF DESCRIPTION OF THE DRAWINGS

The appended drawings not only depict the manner of construction of my invention but also graphically illustrate the use thereof in several ways which have been mentioned herein above. Referring more particularly thereto.

DETAILED DESCRIPTION OF THE PREFERRED EMBODIMENT OF THE INVENTION

Figure 1:
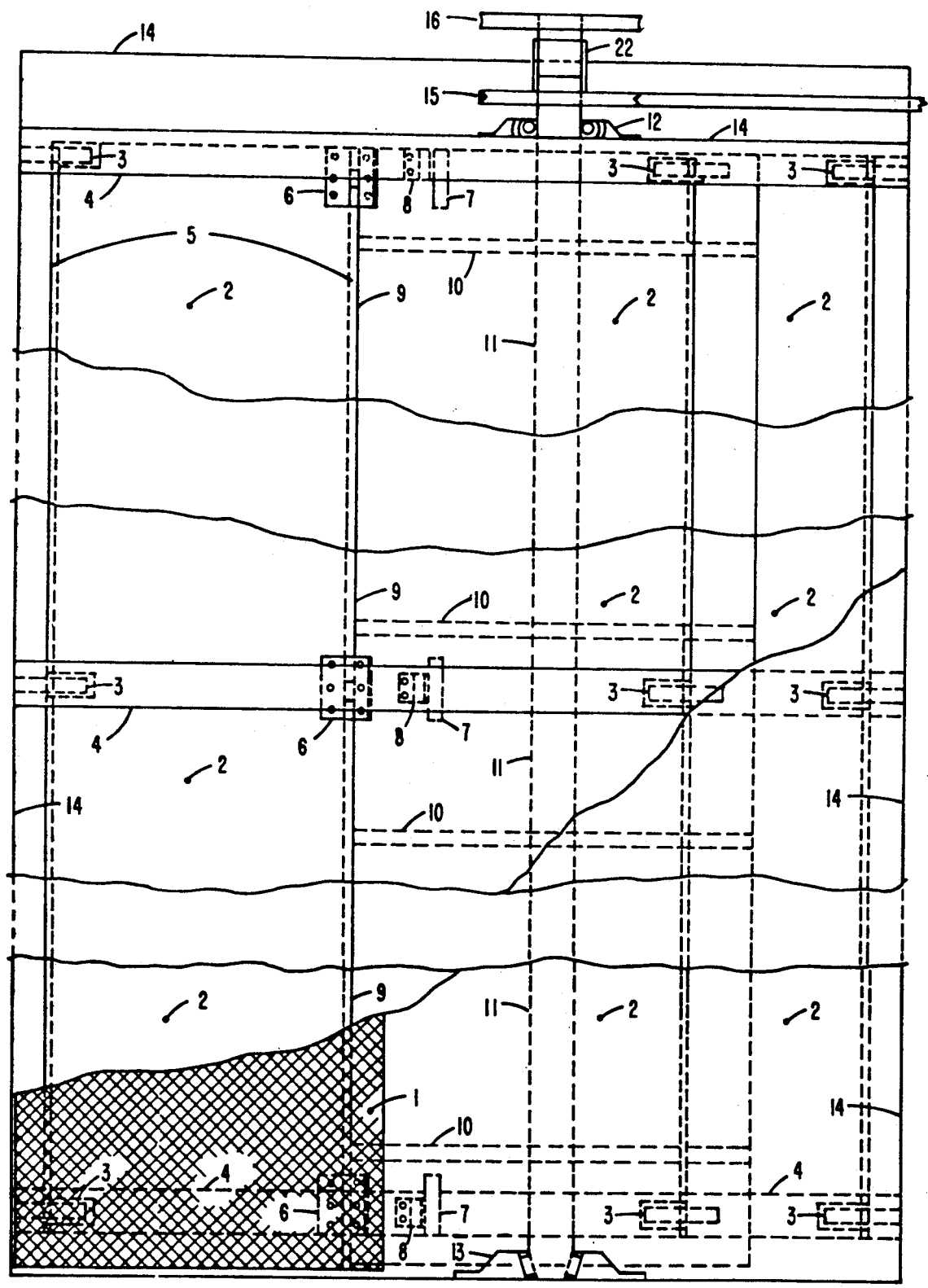
FIG. 1 is a sectional side view, partially in schematic, of the invention illustrating segmented operating mechanisms, and also particularly illustrating as cut sectional views the total converter.
Figure 2:
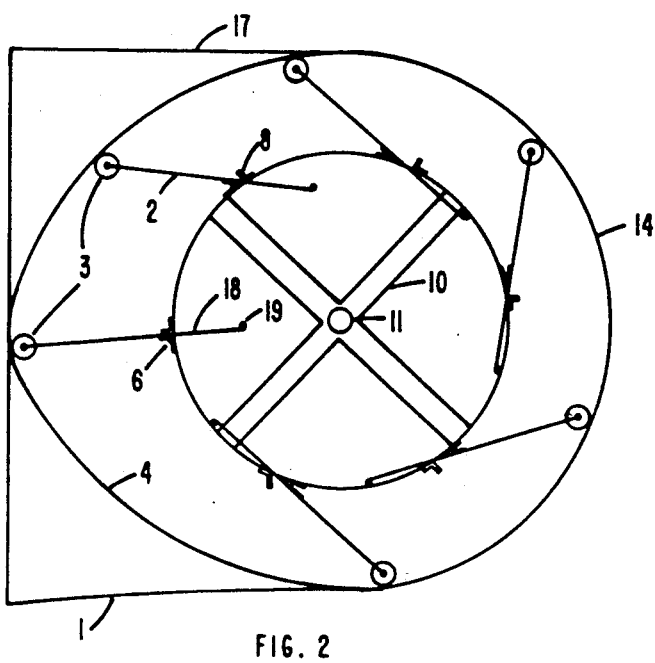
FIG. 2 is a schematic top view of the invention illustrating the primary design characteristics which relate to the elliptical shape of the operating air fin wheel tracks and housing along with the rotating cylinder.
Figure 3:
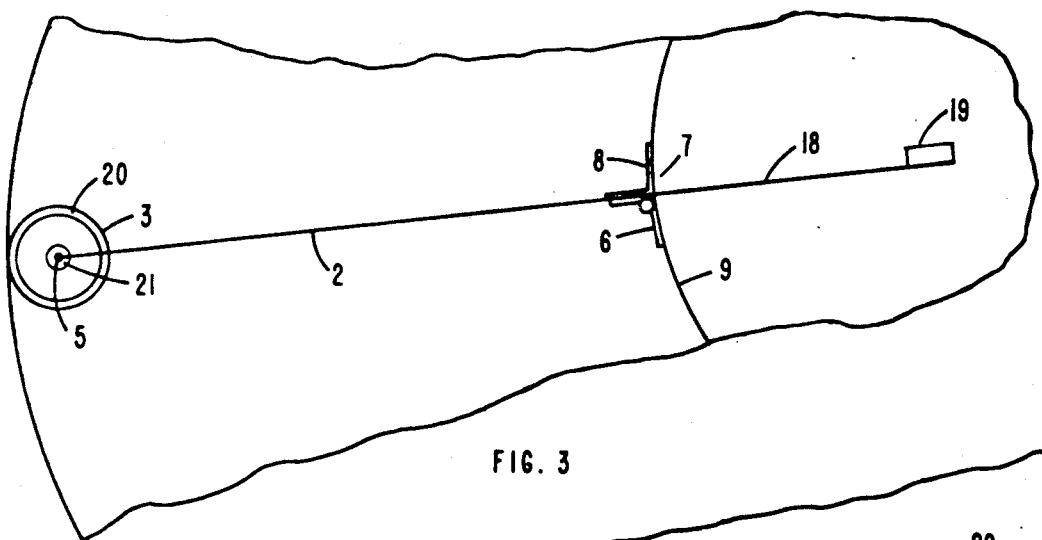
FIG. 3 is a cut sectional enlarged view of the invention with the air fin(s) in the extended position.
Figure 4:
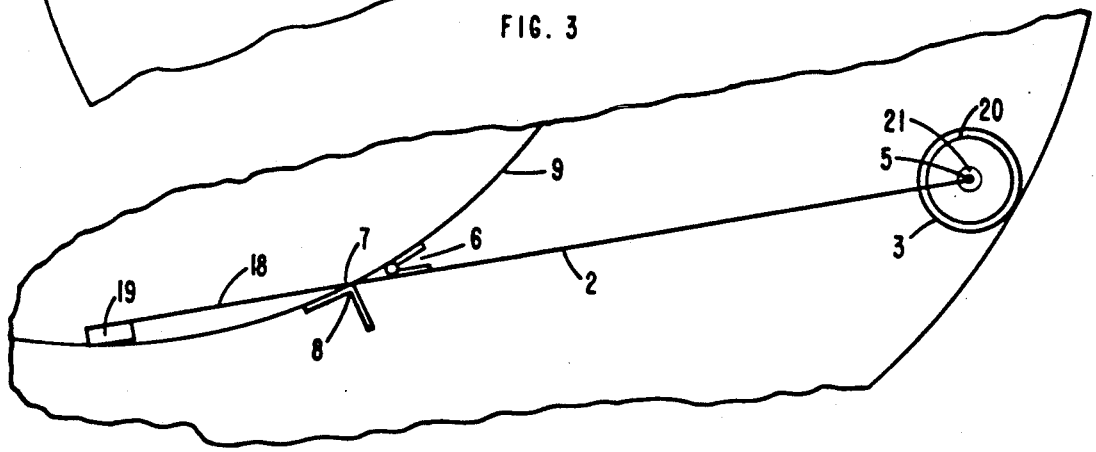
FIG. 4 is a cut sectional enlarged view of the invention with the air fin(s) in the retracted position.
Figure 5:
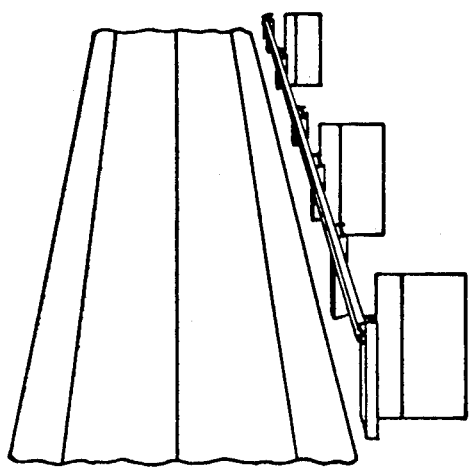
FIG. 5 is a graphic illustration which relates to positioning and installation of the converter units alongside a roadway or as would appear alongside a railway.
Figure 6:
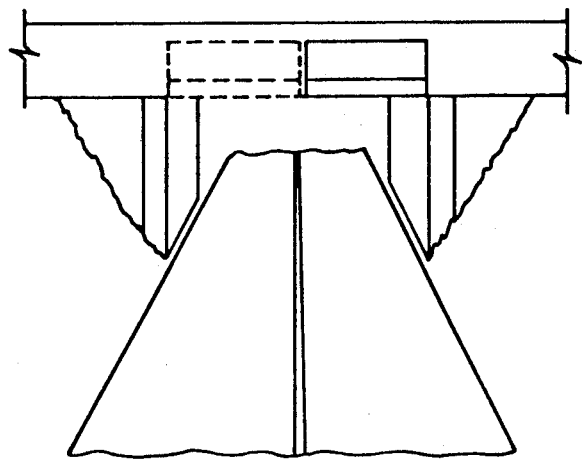
FIG. 6 is a graphic illustration of the converter units installed on the side of an overpass bridge above a roadway or as would appear above a railway.
Figure 7:
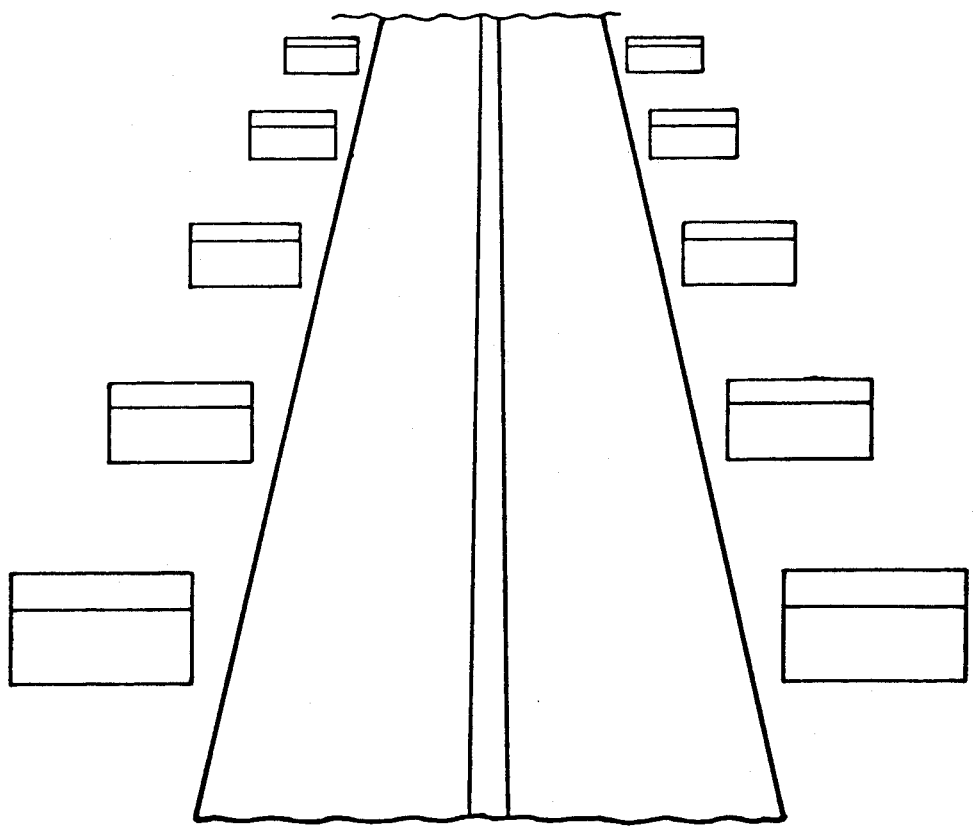
FIG. 7 is a graphic illustration of the converter units installed on either side of an airfield runway.

In FIGS. 1,2,3 & 4 the embodiment of my invention is represented as a vehicle compressed air energy converter by 1 being the heavy wire mesh covered air scoop wherein air enters the converter while 2 are the air fins that rotate as the compressed air pressure on the air fin surface forces them to move. 3 are the wheels that travel on 4 which is the elliptical shaped track to cause the air fins to extend and retract as they rotate. 5 is the rod in the outer and inner edge of each air fin that both reinforces the air fins 2 and serves as an axle for the wheels 3 and for 6 which is a hinge that is attached to the movable air fin 2 and the circular rotating section 9. 7 are openings in the circular rotating section 9 to allow extension of the air fins 2 within that section. 8 are fixed stops attached to the circular rotating section 9 to support the air fins 2 when in an extended posture. 10 are the structural supporting bars attaching the circular rotating section 9 to the center axle shaft of the converter 11. 12 is the top ball bearing and cover attached to the converter housing 14 to support the center axle shaft 11, while 13 is the bottom thrust roller bearing and cover attached to the converter housing 14 to support the end of the center axle shaft 11. 15 is a V-belt drive pulley attached to the center axle shaft 11 inside the housing 14 to propel ancillary equipment outside the housing 14, while 16 is also a V-belt drive pulley attached to the center axle shaft 11 extending outside housing 14 to propel ancillary equipment. 17 is the heavy wire mesh covered air discharge opening in the housing 14. 18 is that portion of the air fins 2 that extend inside the circular rotating section 9 to provide support for the air fins 2 when in a retracted position, while 19 is a flexible material bumping block attached to the end of the air fin extension 18. 20 is the flexible material tires on wheels 3 and 21 is a roller bearing mounted within each wheel 3 and on axle rod 5. 22 is a center axle shaft sleeve to allow removal or installation of V-belt drive pulley 16 as needed. FIGS. 5, 6 & 7 are as herein above described.

I claim:

1. A vehicle compressed air energy converter, comprising:
   an elliptical shaped housing with wire mesh covered air intake and exhaust openings;
   a center axle shaft which is rotatable and set in bearings attached to said elliptical shaped housing;
   the axle shaft attached to and supporting a rotatable circular drum containing a multiplicity of air fins;
   said multiplicity of air fins are attached to said circular drum by hinges with each air fin being equipped with ball-bearing supported cushioned wheels on a radially outer end of the air fin contacting said elliptical shaped housing and a cushion pad at a radially inner end of the air fin contacting the inside of said circular drum;
   said circular drum equipped with L-shaped air fin stops to maintain the air fins in a position perpendicular to the surface of said circular drum when said air fins are in an extended position, and,
   said air fins extend and retract within said converter elliptical shaped housing as air pressure on the surface of said air fins causes said circular drum and axle shaft to rotate.

2. A vehicle compressed air energy converter as claimed in claim 1, further comprising means at an end of said axle shaft to communicate developed torque to power ancillary equipment.

* * * * *